UNITED STATES PATENT OFFICE.

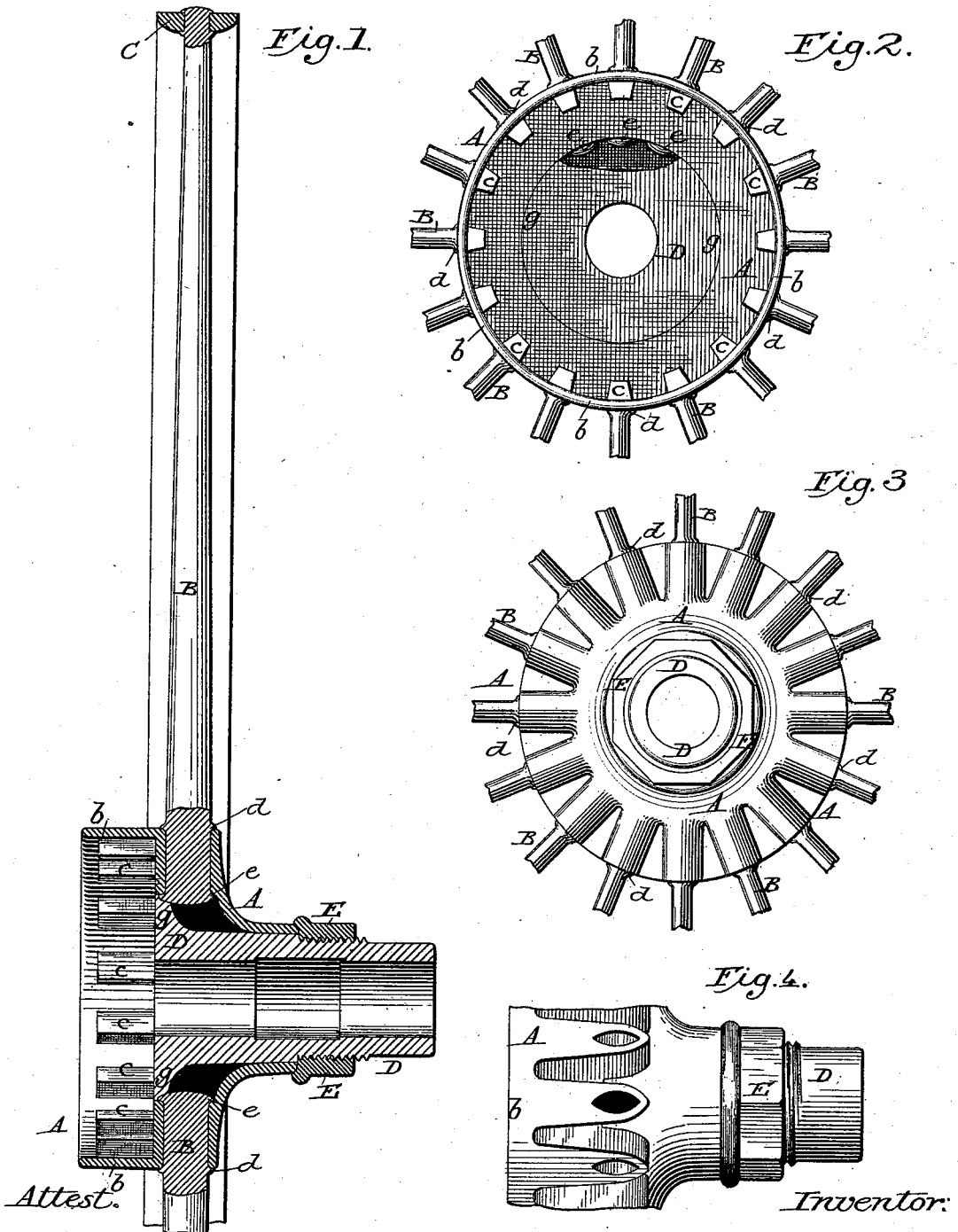

WILLIAM P. BETTENDORF, OF DAVENPORT, IOWA.

WHEEL.

SPECIFICATION forming part of Letters Patent No. 374,576, dated December 13, 1887.

Application filed June 14, 1887. Serial No. 241,254. (No model.)

*To all whom it may concern:*

Be it known that I, WILLIAM P. BETTENDORF, of Davenport, in the county of Scott and State of Iowa, have invented certain Improvements in Metallic Wheels, of which the following is a specification.

This invention relates to a metallic wheel peculiarly adapted for use in connection with hay-rakes, corn-drills, and equivalent machines requiring clutch sprocket or gear wheel on the side or end of the hub.

In the accompanying drawings, Figure 1 represents an axial section of a wheel constructed on my plan. Fig. 2 is a view looking against the inner end of the hub. Fig. 3 is a view looking against the outer end of the hub. Fig. 4 is a top plan view of a portion of the hub and box.

Referring to the drawings, A represents a metallic hub; B, the metallic spokes fixed at their inner ends permanently to said hub; C, the metallic rim permanently fixed to the outer ends of the spokes, and D the metallic box or axle, being removably fitted to the hub. The hub A is cast complete in one piece, preferably of malleable iron, with a series of spoke-receiving sockets or mortises opening therethrough from the center to the periphery. At the inner end the hub is enlarged and formed with an angular overhanging flange, $b$, which may be provided with internal teeth, $c$, to receive a pawl or clutch-dog on the shaft to be driven, or provided with external teeth to drive a sprocket-chain, pinion, or equivalent device. It is to be understood that the form of these teeth and their location in the interior or exterior are not of the essence of the invention, but are to be modified by the mechanic according to the peculiar requirements of the case. That portion of the hub in which the sockets are formed is made of such diameter that the inner ends of the spokes may stand outside of or beyond the circumference of the removable box D. The spokes are preferably secured by upsetting or enlarging them to form the circumferential beads or flanges $d$ and $e$, in a manner already known to those versed in the art.

The box D is made of tubular form, with the central bore or opening adapted to receive the axle upon which it will revolve. This box is extended through and beyond the hub from the inner side and held to its place by a nut or collar, E, threaded thereon and bearing against the outer end of the hub. At its outer end the box is fitted closely within and supported by the hub, while at its inner end the box is enlarged and provided with a flange, $g$, which is seated within and receives a solid support from the inner enlarged portion of the hub, as shown.

It is to be observed that the inner end of the box stands nearly in line vertically with the spokes, or, in other words, that the parts are so formed that the box does not project within the flange or rim $b$. In this way a free unobstructed space is left within the flange $b$ and around the axle for the reception of the usual pawls, dogs, or clutching devices.

Having thus described my invention, what I claim is—

1. The metal hub formed in one piece with the flange or rim $b$, and the spoke-sockets, in combination with the metal spokes fixed in said sockets, as described, and the central box, D, formed and applied substantially as described.

2. In a metal wheel, the hub having its inner end enlarged and provided with the spoke-sockets and the annular flange or rim $b$, the whole cast in one piece, in combination with the metal spokes seated in the sockets and headed at the inner ends, and the box seated in the hub, its inner end enlarged, as described.

In testimony whereof I hereunto set my hand, this 25th day of April, 1887, in the presence of two attesting witnesses.

WILLIAM P. BETTENDORF.

Witnesses:
A. H. AHRENS,
HY. NADLER.